US012438308B2

(12) United States Patent
Lin et al.

(10) Patent No.: US 12,438,308 B2
(45) Date of Patent: Oct. 7, 2025

(54) ELECTRICAL CONNECTOR WITH HIGH-FREQUENCY SIGNAL TRANSMISSION

(71) Applicant: Cheng Uei Precision Industry Co., LTD., New Taipei (TW)

(72) Inventors: Pei-Yi Lin, New Taipei (TW); Chuan-Hung Lin, New Taipei (TW); Sheng-Nan Yu, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 395 days.

(21) Appl. No.: 18/104,783

(22) Filed: Feb. 1, 2023

(65) Prior Publication Data

US 2024/0055805 A1 Feb. 15, 2024

(30) Foreign Application Priority Data

Aug. 10, 2022 (CN) ......................... 202222102934.9

(51) Int. Cl.

*H01R 13/6471* (2011.01)
*H01R 13/516* (2006.01)
*H01R 13/629* (2006.01)
*H01R 24/60* (2011.01)

(52) U.S. Cl.

CPC ....... *H01R 13/6471* (2013.01); *H01R 13/516* (2013.01); *H01R 13/629* (2013.01); *H01R 24/60* (2013.01)

(58) Field of Classification Search

None

See application file for complete search history.

(56) References Cited

U.S. PATENT DOCUMENTS

| | | | | |
|---|---|---|---|---|
| 9,455,535 | B1 * | 9/2016 | Chiang | H01R 13/6581 |
| 10,103,492 | B2 * | 10/2018 | Ju | H01R 13/631 |
| 2017/0352973 | A1 * | 12/2017 | Zhang | H01R 24/60 |
| 2021/0091520 | A1 * | 3/2021 | Chang | H01R 24/60 |
| 2021/0257789 | A1 * | 8/2021 | Chang | H01R 13/502 |
| 2023/0283025 | A1 * | 9/2023 | Lin | H01R 13/6597 439/634 |

* cited by examiner

*Primary Examiner* — Oscar C Jimenez

(74) *Attorney, Agent, or Firm* — Cheng-Ju Chiang

(57) ABSTRACT

An electrical connector includes an insulation body, a terminal assembly mounted in the insulation body, and two shielding pieces. The terminal assembly includes a plurality of grounding terminals, a plurality of signal terminals and two locating blocks. The plurality of the grounding terminals and the plurality of the signal terminals are mounted in the two locating blocks. The two locating blocks together with the plurality of the grounding terminals and the signal terminals are arranged in two rows. The two shielding pieces are disposed at an upper surface and a lower surface of a front end of the insulation body. Each shielding piece has a fixing piece. Two sides of a rear edge of the fixing piece extend rearward to form two first shielding portions. The first shielding portions of the two shielding pieces shield the signal terminals of two sides of the terminal assembly.

12 Claims, 5 Drawing Sheets

ELECTRICAL CONNECTOR WITH HIGH-FREQUENCY SIGNAL TRANSMISSION

CROSS-REFERENCE TO RELATED APPLICATION

The present application is based on, and claims priority from, China Patent Application No. 202222102934.9, filed Aug. 10, 2022, the disclosure of which is hereby incorporated by reference herein in its entirety.

BACKGROUND OF THE INVENTION

1. Field of the Invention

The present invention generally relates to an electrical connector, and more particularly to an electrical connector for improving a high frequency signal transmission.

2. The Related Art

A universal series bus (USB) connector is the most widely used connector which are often used in various electronic products. With the development of sciences and technologies, there are more and more types of the USB connectors, such as USB 2.0 connector, USB 3.0 connector, micro-USB connector, mini-USB connector or USB type-C connector. Now the USB type-C connector reaches 40 Gbps transmission speed specification, so the USB type-C connectors are commonly applied in the various electronic products.

However, when a high frequency signal is transmitted, an inner structure of a conventional type-C connector is apt to cause a resonance, correspondingly, a high-frequency performance is particularly poor in a certain frequency band, and an impedance is mismatched, signal insertion losses and reflection losses are deteriorated, so a crosstalk result is affected. Furthermore, the above-mentioned phenomena will be more serious at a high frequency condition, so that quality of transmitting high frequency signals of the electrical connector are affected.

Therefore, it is necessary to provide an electrical connector with an innovative design, the electrical connector is used for improving a high frequency signal transmission.

SUMMARY OF THE INVENTION

An object of the present invention is to provide an electrical connector. The electrical connector includes an insulation body, a terminal assembly and two shielding pieces. The terminal assembly is mounted in the insulation body. The terminal assembly includes a plurality of grounding terminals, a plurality of signal terminals and two locating blocks. The plurality of the grounding terminals and the plurality of the signal terminals are mounted in the two locating blocks. The two locating blocks together with the plurality of the grounding terminals and the signal terminals are arranged in two rows. Each row of the grounding terminals and the signal terminals are arranged along a transverse direction. Each two adjacent signal terminals are arranged between two grounding terminals along the transverse direction. Two sides of an outer surface of each locating block are recessed inward to form two depressions. The signal terminals of two sides of the terminal assembly are exposed to the depressions of the two locating blocks. The two shielding pieces are disposed at an upper surface and a lower surface of a front end of the insulation body.

Each shielding piece has a fixing piece. Two sides of a rear edge of the fixing piece extend rearward to form two first shielding portions. The first shielding portions of the two shielding pieces are disposed to an upper surface and a lower surface of the terminal assembly. The first shielding portions of the two shielding pieces are partially disposed in the depressions of the two locating blocks. The first shielding portions of the two shielding pieces shield the signal terminals of the two sides of the terminal assembly.

Another object of the present invention is to provide an electrical connector. The electrical connector includes an insulation body, a terminal assembly and two shielding pieces. The insulation body has a connecting portion connected between two opposite sides of the insulation body, and a plurality of openings penetrating through two sides of a rear end of the connecting portion along an up-down direction. The terminal assembly is mounted in the insulation body. The terminal assembly includes a plurality of grounding terminals, a plurality of signal terminals and two locating blocks. The plurality of the grounding terminals and the plurality of the signal terminals are mounted in the two locating blocks. The two locating blocks together with the plurality of the grounding terminals and the signal terminals are arranged in two rows. Each row of the grounding terminals and the signal terminals are arranged along a transverse direction. Each two adjacent signal terminals are arranged between two grounding terminals along the transverse direction. Two sides of an outer surface of each locating block are recessed inward to form two depressions. The signal terminals of two sides of the terminal assembly are exposed to the depressions of the two locating blocks. The two shielding pieces are disposed at an upper surface and a lower surface of a front end of the insulation body. Each shielding piece has a fixing piece. Two sides of a rear edge of the fixing piece extend rearward to form two first shielding portions. The two sides of the rear edge of the fixing piece extend rearward, then are bent towards the insulation body and further extend frontward to form two curved contacting portions. The two curved contacting portions are located adjacent to two outer sides of the two first shielding portions. The first shielding portions of the two shielding pieces are disposed to an upper surface and a lower surface of the terminal assembly. The first shielding portions of the two shielding pieces are partially disposed in the depressions of the two locating blocks. The first shielding portions of the two shielding pieces shield the signal terminals of the two sides of the terminal assembly. The curved contacting portions of the two shielding pieces are positioned in the openings of the insulation body, and the curved contacting portions of the two shielding pieces contact with parts of the plurality of the grounding terminals.

Another object of the present invention is to provide an electrical connector. The electrical connector includes an insulation body, a terminal assembly and two shielding pieces. The terminal assembly is mounted in the insulation body. The terminal assembly includes an upper terminal module, and a lower terminal module mounted under the upper terminal module. The upper terminal module includes one locating block, and a plurality of upper terminals located to the one locating block. The lower terminal module includes the other locating block, and a plurality of lower terminals located to the other locating block. The plurality of the upper terminals are arranged along a transverse direction. The plurality of the upper terminals include a plurality of upper grounding terminals and a plurality of upper signal terminals. Each two adjacent upper signal terminals are arranged between two upper grounding terminals. The plurality of the lower terminals are arranged along the transverse direction. The plurality of the lower terminals include a plurality of lower grounding terminals and a plurality of lower signal terminals. Each two adjacent lower signal terminals are arranged between two lower grounding terminals. Two sides of an outer surface of each locating block are recessed inward to form two depressions. The upper signal terminals and the lower signal terminals of two sides of the terminal assembly are exposed to the depressions of the two locating blocks. The two shielding pieces are disposed at an upper surface and a lower surface of a front end of the insulation body. Each shielding piece has a fixing piece. Two sides of a rear edge of the fixing piece extend rearward to form two first shielding portions. The first shielding portions of the two shielding pieces are disposed to an upper surface and a lower surface of the terminal assembly. The first shielding portions of the two shielding pieces are partially disposed in the depressions of the two locating blocks. The first shielding portions of the two shielding pieces shield the upper signal terminals and the lower signal terminals of the two sides of the terminal assembly.

As described above, rear ends of the two shielding pieces form the first shielding portions, the first shielding portions of the two shielding pieces are disposed to an upper surface and a lower surface of the terminal assembly, respectively, rear ends of the first shielding portions of the two shielding pieces are received in the depressions of the two locating blocks of the terminal assembly, the rear ends of the first shielding portions of the two shielding pieces shield upper fixing portions of the upper signal terminals and lower fixing portions of the lower signal terminals of the two sides of the terminal assembly, so a high frequency stability of the electrical connector is improved. As a result, the electrical connector is used for improving a high frequency signal.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
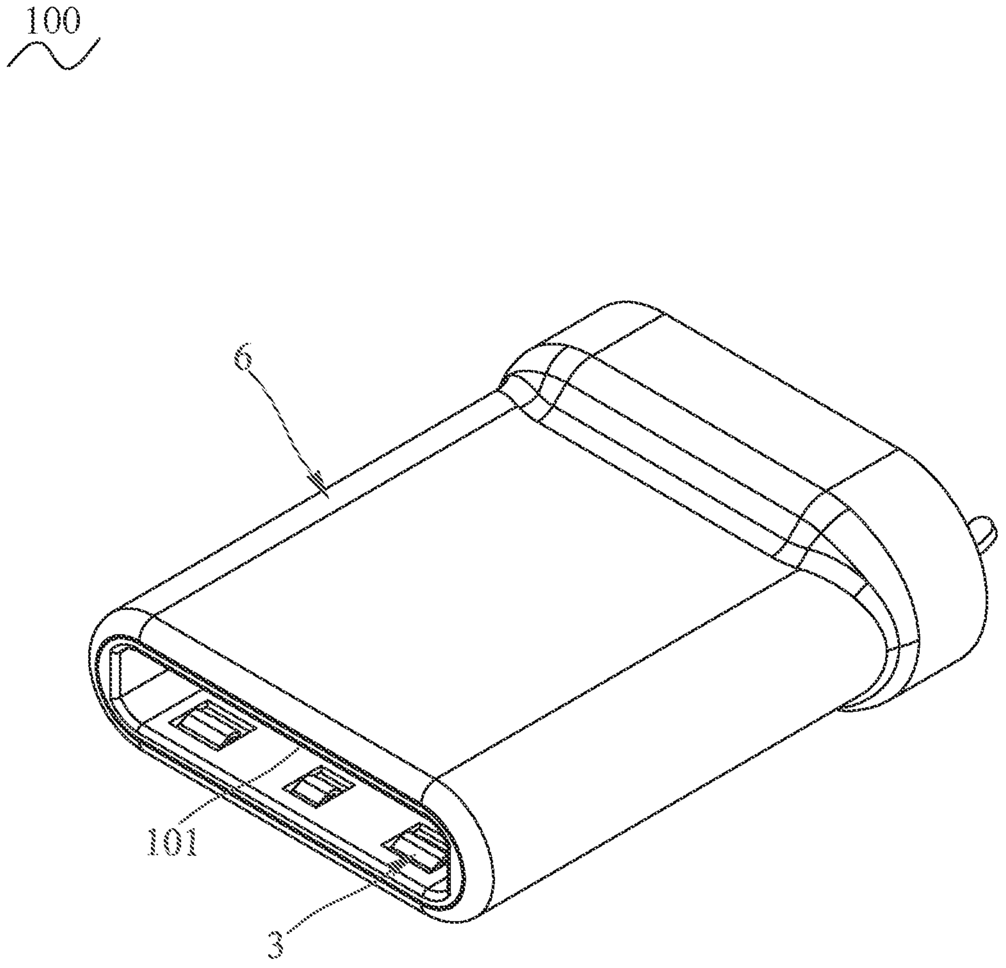
FIG. 1 is a perspective view of an electrical connector in accordance with a preferred embodiment of the present invention.
Figure 2:
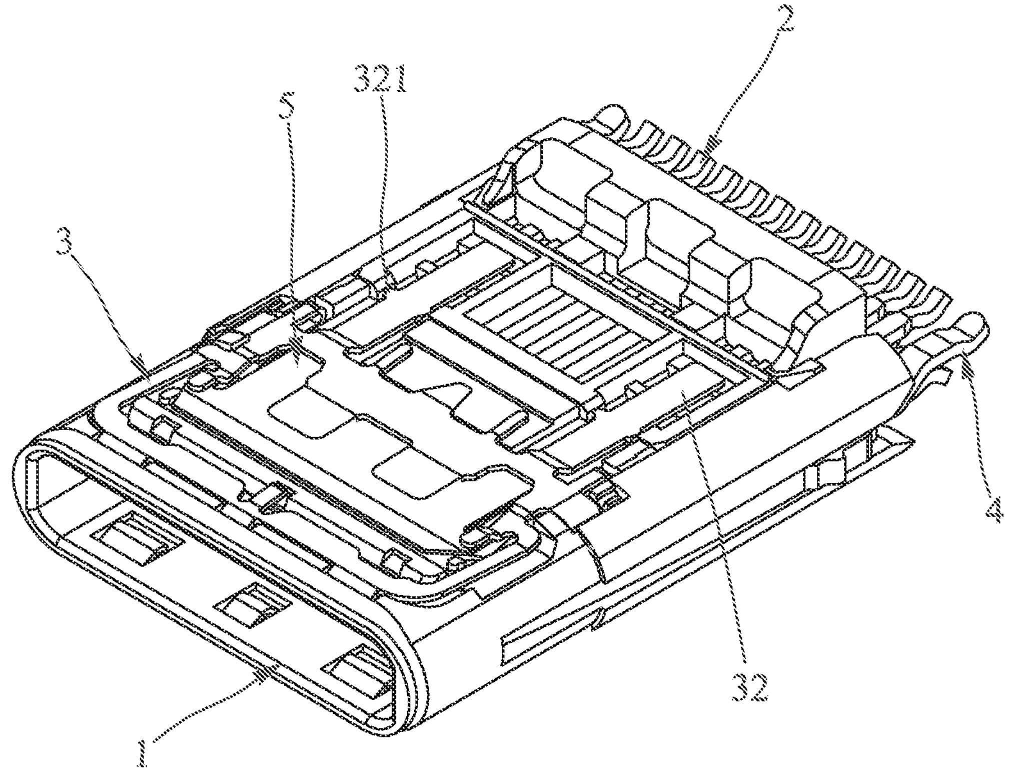
FIG. 2 is a partial perspective view of the electrical connector in accordance with the preferred embodiment of the present invention.

Referring to FIG. 1 and FIG. 2, an electrical connector 100 in accordance with a preferred embodiment of the present invention is shown. The electrical connector 100 includes an insulation body 1, a terminal assembly 2, two shielding pieces 3, a center sheet 4, two blocking sheets 5 and a shell 6.

The terminal assembly 2 is mounted in the insulation body 1. The two shielding pieces 3 are disposed at an upper surface and a lower surface of a front end of the insulation body 1. The center sheet 4 is mounted in the terminal assembly 2. The two blocking sheets 5 are arranged at the upper surface and the lower surface of the front end of the insulation body 1. One blocking sheet 5 is positioned between the upper surface of the front end of the insulation body 1 and one shielding piece 3. The other blocking sheet 5 is positioned between the lower surface of the front end of the insulation body 1 and the other shielding piece 3. The two blocking sheets 5 are covered to two fronts of an upper portion and a lower portion of the terminal assembly 2. The shell 6 surrounds the insulation body 1, the terminal assembly 2, the two shielding pieces 3, the center sheet 4 and the two blocking sheets 5 to fix the terminal assembly 2, the two shielding pieces 3, the center sheet 4 and the two blocking sheets 5 in the insulation body 1 and the shell 6.

Figure 3:
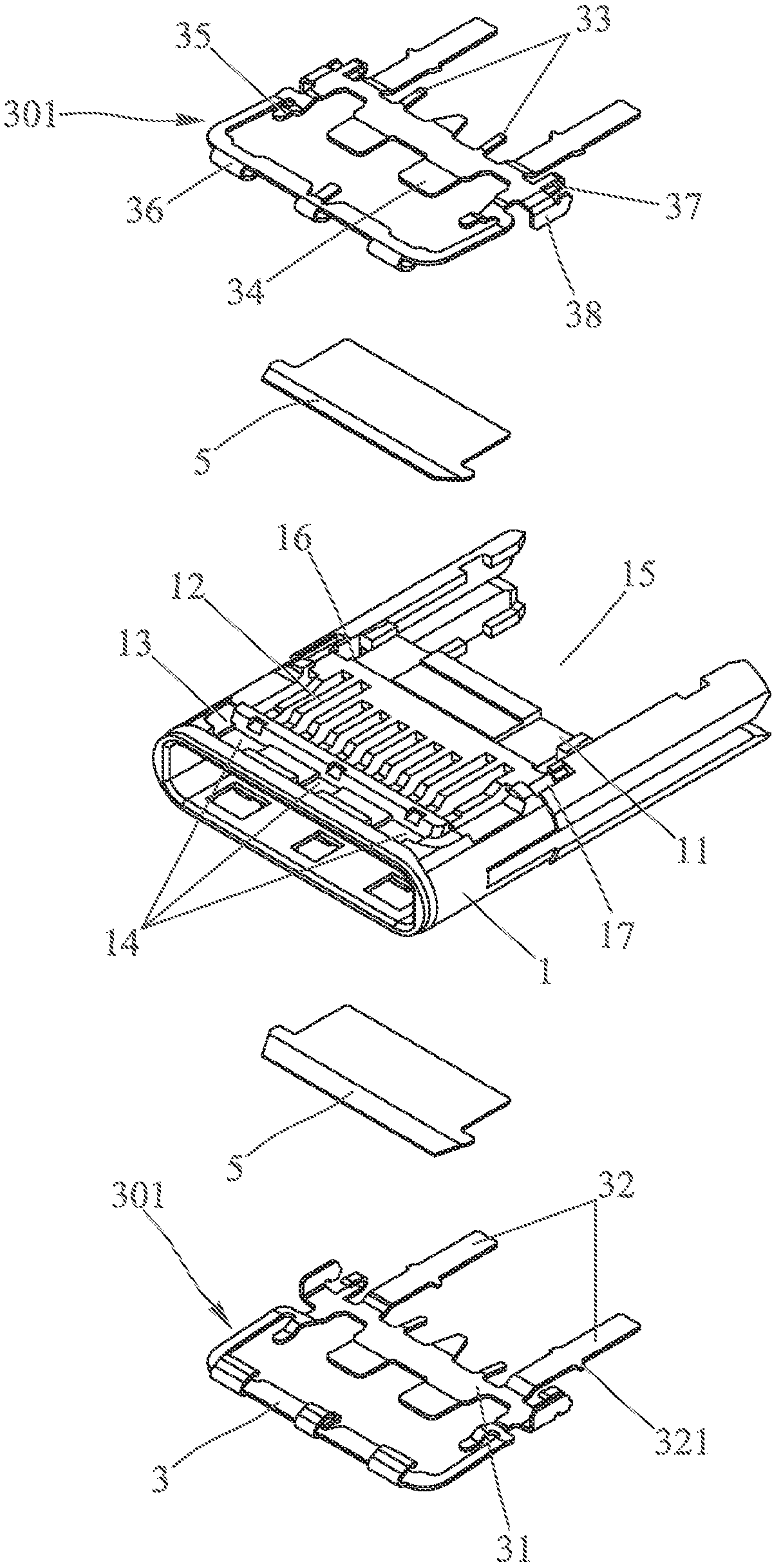
FIG. 3 is a partially exploded view of the electrical connector in accordance with the preferred embodiment of the present invention.

Referring to FIG. 1 to FIG. 3, the insulation body 1 has a connecting portion 11, a plurality of terminal slots 12, two recess portions 13, a plurality of through holes 14, an accommodating groove 15, a plurality of openings 16 and a plurality of positioning portions 17. The connecting portion 11 is formed at a middle of the insulation body 1. The connecting portion 11 is connected between two opposite sides of the insulation body 1. A middle of the connecting portion 11 defines an insertion space 101 penetrating through a front surface of the connecting portion 11. The connecting portion 11 of the insulation body 1 defines the plurality of the terminal slots 12 arranged in two rows. The two rows of the terminal slots 12 include an upper row of the terminal slots 12 and a lower row of the terminal slots 12 which are arranged along an up-down direction. The upper row of the terminal slots 12 penetrate through an upper portion of a rear end and a middle of an upper surface of the connecting portion 11. The lower row of the terminal slots 12 penetrate through a lower portion of the rear and a middle of a lower surface of the connecting portion 11. A corresponding structure of the terminal assembly 2 is arranged in the plurality of the terminal slots 12.

The two recess portions 13 are formed at the upper surface and the lower surface of the front end of the insulation body 1. Two front ends of the upper surface and the lower surface of the connecting portion 11 are recessed inward to form the two recess portions 13. Corresponding mechanisms of the two shielding pieces 3 are arranged in the two recess portions 13. The insulation body 1 has the plurality of the through holes 14 penetrating through two facing walls of the two recess portions 13 along the up-down direction. Corresponding portions of the two shielding pieces 3 are disposed in the plurality of the through holes 14, so that the two shielding pieces 3 are located to the insulation body 1, and the two shielding pieces 3 are fixed to the insulation body 1.

A rear end of the insulation body 1 has the accommodating groove 15 penetrating through a rear surface and two rears of the upper surface and the lower surface of the insulation body 1. The accommodating groove 15 is located behind the connecting portion 11. The terminal assembly 2 and the center sheet 4 are accommodated in the accommodating groove 15. The plurality of the openings 16 are formed at two sides of the rear end of the connecting portion 11. The plurality of the openings 16 penetrate through the two sides of the rear end of the connecting portion 11 along the up-down direction. Two openings 16 penetrate through two middles of two sides of the upper surface of the insulation body 1. The other two openings 16 penetrate through two middles of two sides of the lower surface of the insulation body 1. The plurality of the openings 16 are communicated with the insertion space 101. Corresponding sections of the two shielding pieces 3 are mounted in the plurality of the openings 16. Two middles of the two sides of the insulation body 1 define the plurality of the positioning portions 17 penetrating through the two middles of the two sides of the insulation body 1 along the up-down direction. The plurality of the positioning portions 17 are communicated with the insertion space 101. Corresponding segments of the two shielding pieces 3 are arranged in the plurality of the positioning portions 17, so that the two shielding pieces 3 are located to the insulation body 1, and the two shielding pieces 3 are fixed to the insulation body 1.

In this preferred embodiment, the plurality of the through holes 14 are arranged into two groups. Each group of the through holes 14 include three through holes 14. A quantity of the plurality of the through holes 14 is six. Each group of the through holes 14 are formed in one recess portion 13, so each recess portion 13 has three through holes 14.

Figure 4:
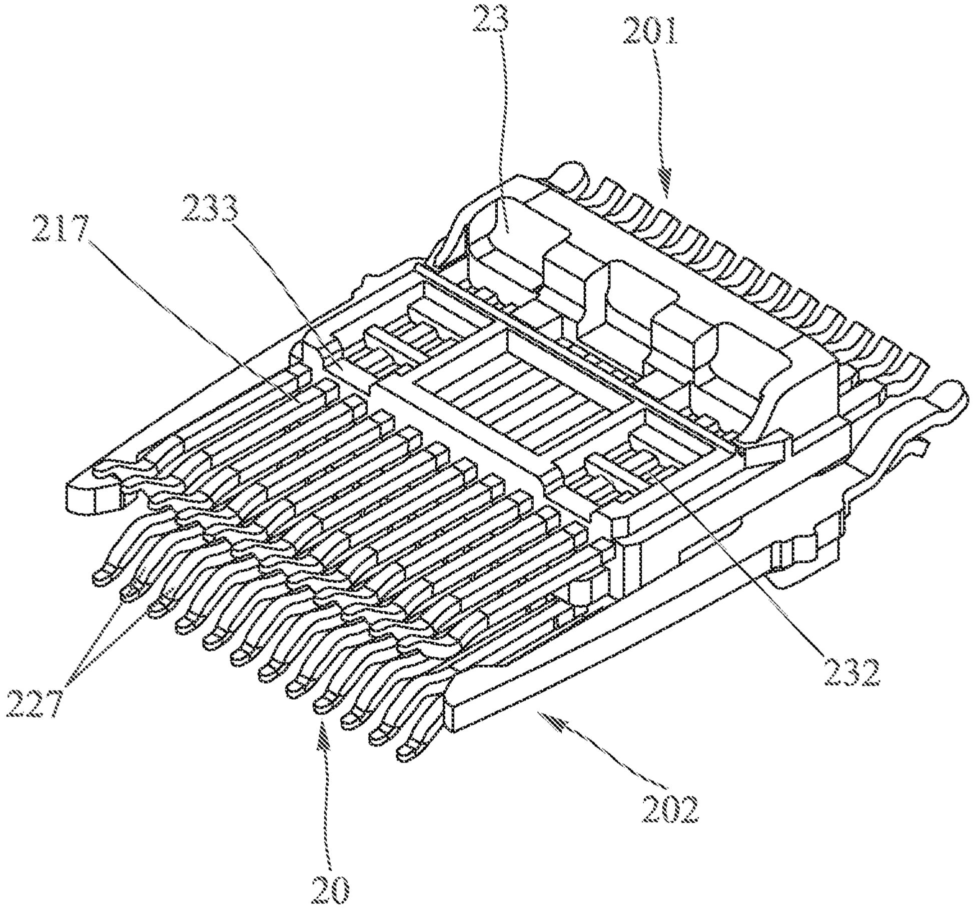
FIG. 4 is another partial perspective view of the electrical connector in accordance with the preferred embodiment of the present invention.
Figure 5:
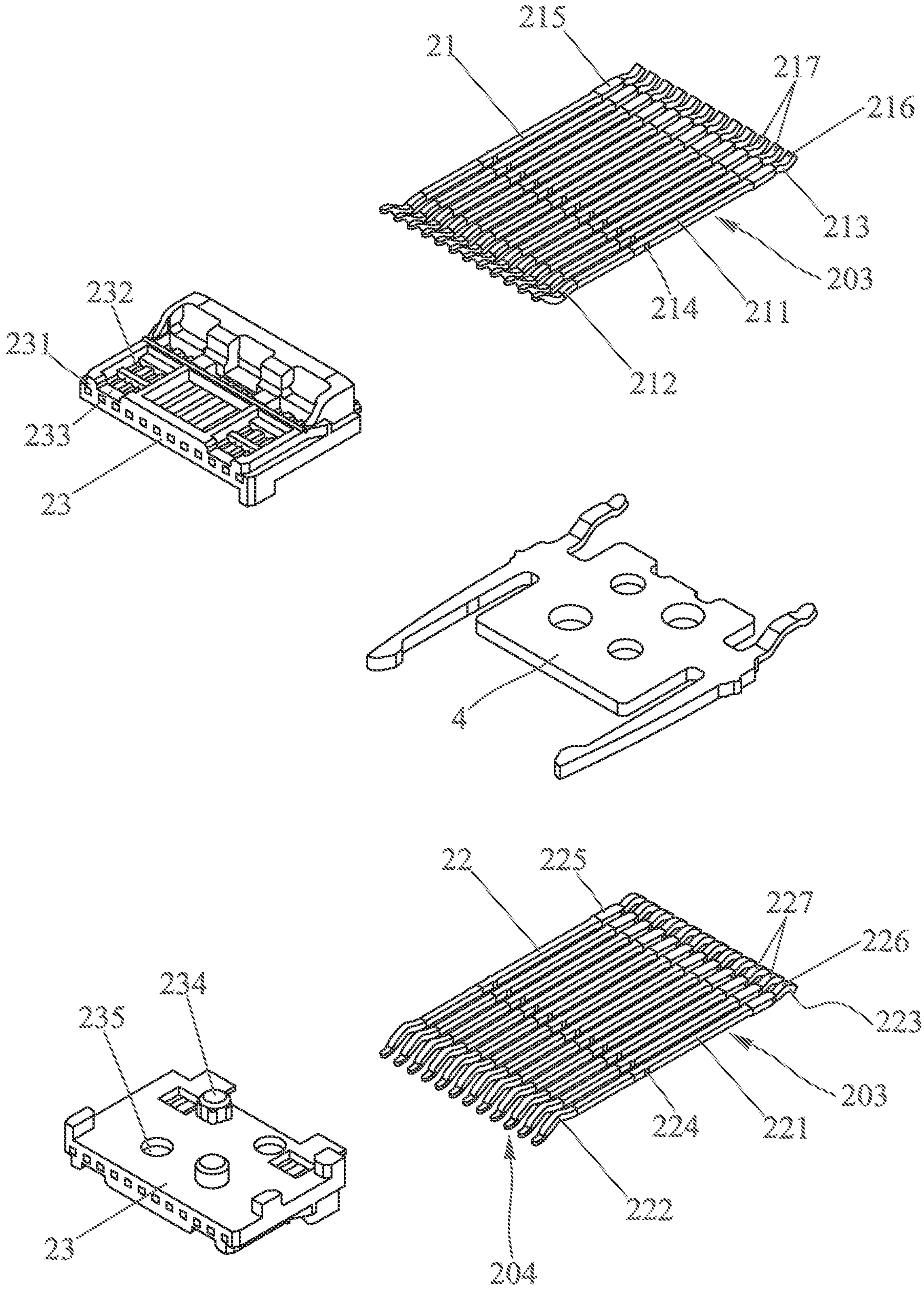
FIG. 5 is another partially exploded view of the electrical connector in accordance with the preferred embodiment of the present invention.

Referring to FIG. 4 and FIG. 5, the terminal assembly 2 includes an upper terminal module 201, and a lower terminal module 202 mounted under the upper terminal module 201. The terminal assembly 2 includes a plurality of upper terminals 21, a plurality of lower terminals 22 and two locating blocks 23. The upper terminal module 201 includes one locating block 23, and the plurality of the upper terminals 21 located to the one locating block 23. The lower terminal module 202 includes the other locating block 23, and the plurality of the lower terminals 22 located to the other locating block 23. The center sheet 4 is mounted between the upper terminal module 201 and the lower terminal module 202. The center sheet 4 is arranged between the one locating block 23 together with the plurality of the upper terminals 21 and the other locating block 23 together with the plurality of the lower terminals 22.

Each upper terminal 21 has an upper fixing portion 211, an upper contacting portion 212 and an upper soldering portion 213. The upper contacting portion 212 is extended frontward from a front end of the upper fixing portion 211. The upper contacting portions 212 of the plurality of the upper terminals 21 are exposed outside of the upper surface of the insulation body 1 and exposed outside of front ends of the upper row of the terminal slots 12. The upper soldering portion 213 is extended rearward from a rear end of the upper fixing portion 211. The upper soldering portions 213 of the plurality of the upper terminals 21 are exposed beyond the rear surface of the insulation body 1 and exposed outside of the accommodating groove 15.

Two middles of two sides of the upper fixing portion 211 protrude oppositely to form two upper bumps 214. The upper bumps 214 of the upper fixing portions 211 of the plurality of the upper terminals 21 are fixed in the one locating block 23, so that the plurality of the upper terminals 21 are located to the one locating block 23, and the plurality of the upper terminals 21 are fixed to the one locating block 23. Two sides of the rear end of the upper fixing portion 211 extend oppositely to form an upper adjusting portion 215. The upper adjusting portion 215 is disposed between the upper fixing portion 211 and the upper soldering portion 213. The upper adjusting portion 215 is used for adjusting an impedance of the electrical connector 100. In this preferred embodiment, a width of the upper adjusting portion 215 is wider than a width of the upper fixing portion 211 along a transverse direction. The plurality of the upper terminals 21 are arranged along the transverse direction. The plurality of the upper terminals 21 include a plurality of upper grounding terminals 216 and a plurality of upper signal terminals 217. In this preferred embodiment, each two adjacent upper signal terminals 217 are arranged between two upper grounding terminals 216. Parts of the plurality of the upper grounding terminals 216 are exposed to the two openings 16 of the upper surface of the insulation body 1.

Each lower terminal 22 has a lower fixing portion 221, a lower contacting portion 222 and a lower soldering portion 223. The lower contacting portion 222 is extended frontward from a front end of the lower fixing portion 221. The lower contacting portions 222 of the plurality of the lower terminals 22 are exposed outside of the lower surface of the insulation body 1 and exposed outside of front ends of the lower row of the terminal slots 12. The lower soldering portion 223 is extended rearward from a rear end of the lower fixing portion 221. The lower soldering portions 223 of the plurality of the lower terminals 22 are exposed beyond the rear surface of the insulation body 1 and exposed outside of the accommodating groove 15.

Two middles of two sides of the lower fixing portion 221 protrude oppositely to form two lower bumps 224. The lower bumps 224 of the lower fixing portions 221 of the plurality of the lower terminals 22 are fixed in the other locating block 23, so that the plurality of the lower terminals 22 are located to the other locating block 23, and the plurality of the lower terminals 22 are fixed to the other locating block 23. Two sides of the rear end of the lower fixing portion 221 extend oppositely to form a lower adjusting portion 225. The lower adjusting portion 225 is disposed between the lower fixing portion 221 and the lower soldering portion 223. The lower adjusting portion 225 is used for adjusting the impedance of the electrical connector 100. In this preferred embodiment, a width of the lower adjusting portion 225 is wider than a width of the lower fixing portion 221 along the transverse direction. The plurality of the lower terminals 22 are arranged along the transverse direction. The plurality of the lower terminals 22 include a plurality of lower grounding terminals 226 and a plurality of lower signal terminals 227. In this preferred embodiment, each two adjacent lower signal terminals 227 are arranged between two lower grounding terminals 226. Parts of the plurality of the lower grounding terminals 226 are exposed to the other two openings 16 of the lower surface of the insulation body 1.

Each locating block 23 has a front wall 231, two depressions 232, two notches 233, a positioning post 234 and a positioning hole 235. A front surface of each locating block 23 protrudes outward to form the front wall 231. Two sides of an outer surface of each locating block 23 are recessed inward to form the two depressions 232. The depressions 232 of the two locating blocks 23 are corresponding to the plurality of the upper signal terminals 217, the plurality of the lower signal terminals 227 and the two shielding pieces 3. Two sides of an outer surface of the front wall 231 are recessed inward to form the two notches 233. The notches 233 of the two locating blocks 23 are corresponding to the two shielding pieces 3. The notches 233 of the two locating blocks 23 are communicated with the depressions 232 of the two locating blocks 23, respectively.

An inner surface of each locating block 23 protrudes towards the center sheet 4 to form the positioning post 234. The inner surface of each locating block 23 is recessed inward to form the positioning hole 235. The positioning post 234 of the one locating block 23 is inserted into the positioning hole 235 of the other locating block 23, so that the two locating blocks 23 are located to each other, and the two locating blocks 23 are fixed with each other. In the preferred embodiment, each locating block 23 has two positioning posts 234 and two positioning holes 235.

The plurality of the upper terminals 21 and the lower terminals 22 together define a plurality of terminals 20. The plurality of the upper grounding terminals 216 and the lower grounding terminals 226 together define a plurality of grounding terminals 203. The plurality of the upper signal terminals 217 and the lower signal terminals 227 together define a plurality of signal terminals 204. Parts of the plurality of the grounding terminals 203 are exposed to the plurality of the positioning portions 17 of the insulation body 1. The terminal assembly 2 includes the plurality of the grounding terminals 203, the plurality of the signal terminals 204 and the two locating blocks 23. The plurality of the grounding terminals 203 and the plurality of the signal terminals 204 being mounted in the two locating blocks 23. The two locating blocks 23 together with the plurality of the grounding terminals 203 and the signal terminals 204 are arranged in two rows. Each row of the grounding terminals 203 and the signal terminals 204 are arranged along the transverse direction. Each two adjacent signal terminals 204 are arranged between two grounding terminals 203 along the transverse direction. The signal terminals 204 of two sides of the terminal assembly 2 are exposed to the depressions 232 of the two locating blocks 23. The upper fixing portions 211 of the upper signal terminals 217 and the lower fixing portions 221 of the lower signal terminals 227 of the two sides of the terminal assembly 2 are exposed to the depressions 232 of the two locating blocks 23.

Referring to FIG. 3 to FIG. 5, each shielding piece 3 has a fixing piece 31, two first shielding portions 32, two second shielding portions 33, two third shielding portions 34, two fourth shielding portions 35, a frame 301, a plurality of flexible sheets 36, two curved contacting portions 37 and two side wing portions 38. The two fixing pieces 31 of the two shielding pieces 3 are arranged on the upper surface and the lower surface of the insulation body 1, respectively. The two fixing pieces 31 of the two shielding pieces 3 are positioned to rears of the plurality of the terminal slots 12 of the insulation body 1. Two sides of a rear edge of the fixing piece 31 extend rearward to form the two first shielding portions 32. The first shielding portions 32 of the two shielding pieces 3 are disposed to an upper surface and a lower surface of the terminal assembly 2. The first shielding portions 32 of the two shielding pieces 3 are partially disposed in the depressions 232 of the two locating blocks 23 of the terminal assembly 2.

The first shielding portions 32 of the two shielding pieces 3 shield the upper signal terminals 217 and the lower signal terminals 227 of the terminal assembly 2 for improving a high frequency stability of the electrical connector 100. Two portions of the rear edge of the fixing piece 31 extend rearward to form the two second shielding portions 33. The two second shielding portions 33 are positioned between the two first shielding portions 32. The two second shielding portions 33 contact with the shell 6. Two portions of a front edge of the fixing piece 31 extend frontward to form the two third shielding portions 34. The third shielding portions 34 of the two shielding pieces 3 are stuck to the two blocking sheets 5, so that each blocking sheet 5 is fastened between the insulation body 1 and the one shielding piece 3.

Two sides of the front edge of the fixing piece 31 extend frontward to form the two fourth shielding portions 35. Two outer edges of the two fourth shielding portions 35 extend oppositely, then extend frontward and further extend towards each other to form the frame 301. The two third shielding portions 34 are arranged between the two fourth shielding portions 35. The fourth shielding portions 35 of the two shielding pieces 3 are adhered to the two blocking sheets 5, so each blocking sheet 5 is fastened between the insulation body 1 and the one shielding piece 3. Several portions of a front edge of the frame 301 are bent rearward, and then are arched towards the insulation body 1 to form the plurality of the flexible sheets 36. End edges of the two fixing pieces 31 of the two shielding pieces 3 are mounted in the recess portions 13 of the insulation body 1. The flexible sheets 36 of the two shielding pieces 3 are mounted in the through holes 14 of the insulation body 1, so that the two shielding pieces 3 are located to the insulation body 1, and the two shielding pieces 3 are fixed to the insulation body 1. The flexible sheets 36 of the two shielding pieces 3 contact with a docking connector (not shown), and the flexible sheets 36 of the two shielding pieces 3 are used to maintain a strength at an insertion and withdrawal process of the electrical connector 100 and the docking connector.

In this preferred embodiment, the plurality of the flexible sheets 36 of the two shielding pieces 3 are divided into two groups. Each group of the flexible sheets 36 include three flexible sheets 36. A total quantity of the flexible sheets 36 is six. The two sides of the rear edge of the fixing piece 31 extend rearward, then are bent towards the insulation body 1 and further extend frontward to form the two curved contacting portions 37. Each curved contacting portion 37 is formed in a U shape. The two curved contacting portions 37 are located adjacent to two outer sides of the two first shielding portions 32. The curved contacting portions 37 of the two shielding pieces 3 are positioned in the openings 16 of the insulation body 1, and the curved contacting portions 37 of the two shielding pieces 3 contact with the parts of the plurality of the grounding terminals 203. In this preferred embodiment, the first shielding portions 32 of the two shielding pieces 3 are arranged among the curved contacting portions 37 of the two shielding pieces 3. Two opposite sides of the fixing piece 31 are bent towards the insulation body 1 to form the two side wing portions 38. The side wing portions 38 of the two shielding pieces 3 are fastened in the positioning portions 17 of the insulation body 1, so that the two shielding pieces 3 are located to the insulation body 1, and the two shielding pieces 3 are fixed to the insulation body 1.

Two middles of two sides of each first shielding portion 32 protrude oppositely to form two protruding portions 321. Rear ends of the first shielding portions 32 of the two shielding pieces 3 are received in the depressions 232 of the two locating blocks 23 of the terminal assembly 2. The first shielding portions 32 of the two shielding pieces 3 shield the signal terminals 204 of the two sides of the terminal assembly 2. The rear ends of the first shielding portions 32 of the two shielding pieces 3 shield the upper fixing portions 211 of the upper signal terminals 217 and the lower fixing portions 221 of the lower signal terminals 227 of the two sides of the terminal assembly 2. Middle portions of the first shielding portions 32 of the two shielding pieces 3 are positioned in the notches 233 of the two locating blocks 23. The protruding portions 321 of the first shielding portions 32 of the two shielding pieces 3 are positioned at the notches 233 of the two locating blocks 23. The two protruding portions 321 of each first shielding portion 32 abut against two opposite inner walls of one notch 233 of the front wall 231 of one locating block 23, so that the two shielding pieces 3 are located to the terminal assembly 2, and the two shielding pieces 3 are fixed to the terminal assembly 2.

In this preferred embodiment, a length of each first shielding portion 32 is longer than a length of each second shielding portion 33. A length of each third shielding portion 34 is longer than a length of each second shielding portion 33, and the length of each second shielding portions 33 is no longer than a length of the connecting portion 11 of the insulation body 1. A length of each fourth shielding portion 35 is longer than a length of each third shielding portion 34.

As described above, rear ends of the two shielding pieces 3 form the first shielding portions 32, the first shielding portions 32 of the two shielding pieces 3 are disposed to an upper surface and a lower surface of the terminal assembly 2, respectively, the rear ends of the first shielding portions 32 of the two shielding pieces 3 are received in the depressions 232 of the two locating blocks 23 of the terminal assembly 2, the rear ends of the first shielding portions 32 of the two shielding pieces 3 shield the upper fixing portions 211 of the upper signal terminals 217 and the lower fixing portions 221 of the lower signal terminals 227 of the two sides of the terminal assembly 2, so the high frequency stability of the electrical connector 100 is improved. As a result, the electrical connector 100 is used for improving a high frequency signal transmission.

What is claimed is:

1. An electrical connector with high-frequency signal transmission, comprising:

an insulation body;

a terminal assembly mounted in the insulation body, the terminal assembly including a plurality of grounding terminals, a plurality of signal terminals and two locating blocks, the plurality of the grounding terminals and the plurality of the signal terminals being mounted in the two locating blocks, the two locating blocks together with the plurality of the grounding terminals and the signal terminals being arranged in two rows, each row of the grounding terminals and the signal terminals being arranged along a transverse direction, each two adjacent signal terminals being arranged between two grounding terminals along the transverse direction, two sides of an outer surface of each locating block being recessed inward to form two depressions, the signal terminals of two sides of the terminal assembly being exposed to the depressions of the two locating blocks; and two shielding pieces disposed at an upper surface and a lower surface of a front end of the insulation body, each shielding piece having a fixing piece, two sides of a rear edge of the fixing piece extending rearward to form two first shielding portions, the first shielding portions of the two shielding pieces being disposed to an upper surface and a lower surface of the terminal assembly, the first shielding portions of the two shielding pieces being partially disposed in the depressions of the two locating blocks, the first shielding portions of the two shielding pieces shielding the signal terminals of the two sides of the terminal assembly;

wherein a front surface of each locating block protrudes outward to form a front wall, two sides of an outer surface of the front wall are recessed inward to form two notches, two middles of two sides of each first shielding portion protrude oppositely to form two protruding portions, the protruding portions of the first shielding portions of the two shielding pieces are positioned at the notches of the two locating blocks, the two protruding portions of each first shielding portion abut against two opposite inner walls of one notch, the notches of the two locating blocks are communicated with the depressions of the two locating blocks, respectively.

2. The electrical connector with high-frequency signal transmission as claimed in claim 1, wherein the insulation body defines a plurality of terminal slots, the fixing pieces are arranged at the rear ends of the terminal slots of the insulation body, the two fixing pieces of the two shielding pieces are positioned to rears of the plurality of the terminal slots of the insulation body.

3. The electrical connector with high-frequency signal transmission as claimed in claim 1, wherein two portions of the rear edge of the fixing piece extend rearward to form two second shielding portions, the two second shielding portions are positioned between the two first shielding portions, a length of each first shielding portion is longer than a length of each second shielding portion.

4. The electrical connector with high-frequency signal transmission as claimed in claim 3, further comprising a shell surrounding the insulation body, the terminal assembly and the two shielding pieces, the two second shielding portions contacting with the shell.

5. The electrical connector with high-frequency signal transmission as claimed in claim 3, wherein two portions of a front edge of the fixing piece extend frontward to form two third shielding portions, two sides of the front edge of the fixing piece extend frontward to form two fourth shielding portions, the two third shielding portions are arranged between the two fourth shielding portions, a length of each third shielding portion is longer than a length of each second shielding portion, a length of each fourth shielding portion is longer than a length of each third shielding portion.

6. The electrical connector with high-frequency signal transmission as claimed in claim 5, wherein the insulation body has a connecting portion connected between two opposite sides of the insulation body, two front ends of an upper surface and a lower surface of the connecting portion are recessed inward to form two recess portions, the insulation body has a plurality of through holes penetrating through two facing walls of the two recess portions along an up-down direction, two outer edges of the two fourth shielding portions extend oppositely, then extend frontward and further extend towards each other to form a frame, several portions of a front edge of the frame are bent rearward, and then are arched towards the insulation body to form a plurality of flexible sheets, end edges of the two fixing pieces of the two shielding pieces are mounted in the recess portions of the insulation body, the flexible sheets of the two shielding pieces are mounted in the through holes of the insulation body.

7. The electrical connector with high-frequency signal transmission as claimed in claim 5, further comprising two blocking sheets arranged at the upper surface and the lower surface of the front end of the insulation body, one blocking sheet being positioned between the upper surface of the front end of the insulation body and one shielding piece, the other blocking sheet being positioned between the lower surface of the front end of the insulation body and the other shielding piece, the third shielding portions of the two shielding pieces being stuck to the two blocking sheets.

8. The electrical connector with high-frequency signal transmission as claimed in claim 1, wherein two sides of the rear edge of the fixing piece extend rearward, then are bent towards the insulation body and further extend frontward to form two curved contacting portions, each curved contacting portion is formed in a U shape, the insulation body has a connecting portion connected between two opposite sides of the insulation body, the insulation body has a plurality of openings, the plurality of the openings penetrate through two sides of a rear end of the connecting portion along an up-down direction, the two curved contacting portions are located adjacent to two outer sides of the two first shielding portions, the curved contacting portions of the two shielding pieces are positioned in the openings of the insulation body, and the curved contacting portions of the two shielding pieces contact with parts of the plurality of the grounding terminals.

9. The electrical connector with high-frequency signal transmission as claimed in claim 1, wherein two middles of two sides of the insulation body define a plurality of positioning portions penetrating through the two middles of the two sides of the insulation body along an up-down direction, two opposite sides of the fixing piece are bent towards the insulation body to form two side wing portions, the side wing portions of the two shielding pieces are fastened in the positioning portions of the insulation body.

10. The electrical connector with high-frequency signal transmission as claimed in claim 1, further comprising a center sheet mounted in the terminal assembly, an inner surface of each locating block protruding towards the center sheet to form a positioning post, the inner surface of each locating block being recessed inward to form a positioning hole, the positioning post of one locating block being inserted into the positioning hole of the other locating block.

11. An electrical connector with high-frequency signal transmission, comprising:

an insulation body having a connecting portion connected between two opposite sides of the insulation body, and a plurality of openings penetrating through two sides of a rear end of the connecting portion along an up-down direction;

a terminal assembly mounted in the insulation body, the terminal assembly including a plurality of grounding terminals, a plurality of signal terminals and two locating blocks, the plurality of the grounding terminals and the plurality of the signal terminals being mounted in the two locating blocks, the two locating blocks together with the plurality of the grounding terminals and the signal terminals being arranged in two rows, each row of the grounding terminals and the signal terminals being arranged along a transverse direction, each two adjacent signal terminals being arranged between two grounding terminals along the transverse direction, two sides of an outer surface of each locating block being recessed inward to form two depressions, the signal terminals of two sides of the terminal assembly being exposed to the depressions of the two locating blocks; and two shielding pieces disposed at an upper surface and a lower surface of a front end of the insulation body, each shielding piece having a fixing piece, two sides of a rear edge of the fixing piece extending rearward to form two first shielding portions, the two sides of the rear edge of the fixing piece extending rearward, then being bent towards the insulation body and further extending frontward to form two curved contacting portions, the two curved contacting portions being located adjacent to two outer sides of the two first shielding portions, the first shielding portions of the two shielding pieces being disposed to an upper surface and a lower surface of the terminal assembly, the first shielding portions of the two shielding pieces being partially disposed in the depressions of the two locating blocks, the first shielding portions of the two shielding pieces shielding the signal terminals of the two sides of the terminal assembly, the curved contacting portions of the two shielding pieces being positioned in the openings of the insulation body, and the curved contacting portions of the two shielding pieces contacting with parts of the plurality of the grounding terminals;

wherein a front surface of each locating block protrudes outward to form a front wall, two sides of an outer surface of the front wall are recessed inward to form two notches, two middles of two sides of each first shielding portion protrude oppositely to form two protruding portions, the protruding portions of the first shielding portions of the two shielding pieces are positioned at the notches of the two locating blocks, the two protruding portions of each first shielding portion abut against two opposite inner walls of one notch, the notches of the two locating blocks are communicated with the depressions of the two locating blocks, respectively.

12. An electrical connector with high-frequency signal transmission, comprising:

an insulation body;

a terminal assembly mounted in the insulation body, the terminal assembly including an upper terminal module, and a lower terminal module mounted under the upper terminal module, the upper terminal module including one locating block, and a plurality of upper terminals located to the one locating block, the lower terminal module including the other locating block, and a plurality of lower terminals located to the other locating block, the plurality of the upper terminals being arranged along a transverse direction, the plurality of the upper terminals including a plurality of upper grounding terminals and a plurality of upper signal terminals, each two adjacent upper signal terminals being arranged between two upper grounding terminals, the plurality of the lower terminals being arranged along the transverse direction, the plurality of the lower terminals including a plurality of lower grounding terminals and a plurality of lower signal terminals, each two adjacent lower signal terminals being arranged between two lower grounding terminals, two sides of an outer surface of each locating block being recessed inward to form two depressions, the upper signal terminals and the lower signal terminals of two sides of the terminal assembly being exposed to the depressions of the two locating blocks; and two shielding pieces disposed at an upper surface and a lower surface of a front end of the insulation body, each shielding piece having a fixing piece, two sides of a rear edge of the fixing piece extending rearward to form two first shielding portions, the first shielding portions of the two shielding pieces being disposed to an upper surface and a lower surface of the terminal assembly, the first shielding portions of the two shielding pieces being partially disposed in the depressions of the two locating blocks, the first shielding portions of the two shielding pieces shielding the upper signal terminals and the lower signal terminals of the two sides of the terminal assembly;

wherein a front surface of each locating block protrudes outward to form a front wall, two sides of an outer surface of the front wall are recessed inward to form two notches, two middles of two sides of each first shielding portion protrude oppositely to form two protruding portions, the protruding portions of the first shielding portions of the two shielding pieces are positioned at the notches of the two locating blocks, the two protruding portions of each first shielding portion abut against two opposite inner walls of one notch, the notches of the two locating blocks are communicated with the depressions of the two locating blocks, respectively.

* * * * *